(12) United States Patent
Baggen et al.

(10) Patent No.: US 8,045,633 B2
(45) Date of Patent: Oct. 25, 2011

(54) ESTIMATION OF LENGTH OF CHANNEL IMPULSE RESPONSE

(75) Inventors: Constant Paul Maie Jozef Baggen, Eindhoven (NL); Sri Andari Husen, Eindhoven (NL); Alessio Filippi, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 672 days.

(21) Appl. No.: 12/161,344

(22) PCT Filed: Jan. 15, 2007

(86) PCT No.: PCT/IB2007/050117
§ 371 (c)(1),
(2), (4) Date: Jul. 18, 2008

(87) PCT Pub. No.: WO2007/083258
PCT Pub. Date: Jul. 26, 2007

(65) Prior Publication Data
US 2009/0067519 A1    Mar. 12, 2009

(51) Int. Cl.
H04L 27/06 (2006.01)
H04L 27/28 (2006.01)
(52) U.S. Cl. .................... 375/260; 375/340
(58) Field of Classification Search ............... 375/142, 375/148, 150, 260, 343
See application file for complete search history.

(56) References Cited

U.S. PATENT DOCUMENTS

| | | | |
|---|---|---|---|
| 6,654,429 B1 | 11/2003 | Li | |
| 2004/0120409 A1* | 6/2004 | Yasotharan et al. | 375/260 |
| 2008/0310484 A1* | 12/2008 | Shattil | 375/146 |
| 2010/0303165 A1* | 12/2010 | Gore et al. | 375/260 |

FOREIGN PATENT DOCUMENTS

| | | |
|---|---|---|
| EP | 0496467 A2 | 7/1992 |
| EP | 1158716 A2 | 11/2001 |
| WO | WO2005117377 A1 | 12/2005 |

OTHER PUBLICATIONS

Zhao et al: "A Novel Channel Estimation Method for OFDM Mobile Communication Systems Based on Pilot Signals and Transform-Domain Processing"; Proceedings of the IEEE 47th Vehicular Technology Conference, 1977, IEEE vol. 3, May 1977, pp. 2089-2093.
Chen et al: "OFDM Timing Synchronisation Under Multi-Path Channels"; Proceedings of the IEEE 57th Semiannual IEEE Vehicular Technology Conference, 2003, vol. 1, Apr. 22-25, 2003, pp. 378-382.

(Continued)

Primary Examiner — Don N Vo
(74) Attorney, Agent, or Firm — Larry Liberchuk

(57) ABSTRACT

In a receiver for processing OFDM encoded signals, wherein the OFDM encoded digital signals are transmitted by means of a symbol in each of subcarrier frequency channels, with at least some of said subcarriers containing user data symbols, an initial estimate of a channel frequency response is formed from magnitudes of user data symbols received in those subcarriers. Then, a correlation function of a channel impulse response is estimated by performing an inverse Fourier transform on the initial estimate of the channel frequency response, and the length of the channel impulse response is estimated by examining peaks in the estimated correlation function of the channel impulse response.

15 Claims, 5 Drawing Sheets

OTHER PUBLICATIONS

Krongold, B.: "A Method for Minimum-Interference OFDM Time Synchronization"; 2003 4th IEEE Workshop on Signal Processing Advances in Wireless Communications, pp. 600-604.

Gallardo et al: "Comparison of Joint Coarse Timing and Fine Carrier Frequency Estimation Algorithms for DVB-T OFDM Based Single Frequency Networks"; IEEE 55th Annual Vehicular Technology Conference, 2002, vol. 2, pp. 580-584.

Lee et al: "Coarse Symbol Synchronization Algorithms for OFDM Systems in Multipath Channels"; IEEE Communications Letters, vol. 6, No. 10, Oct. 2002, pp. 446-448.

* cited by examiner

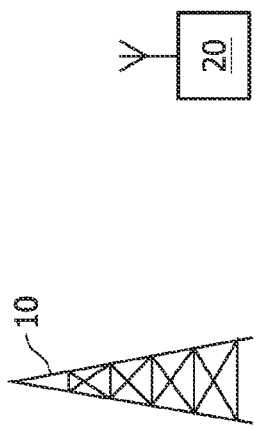
FIG. 1
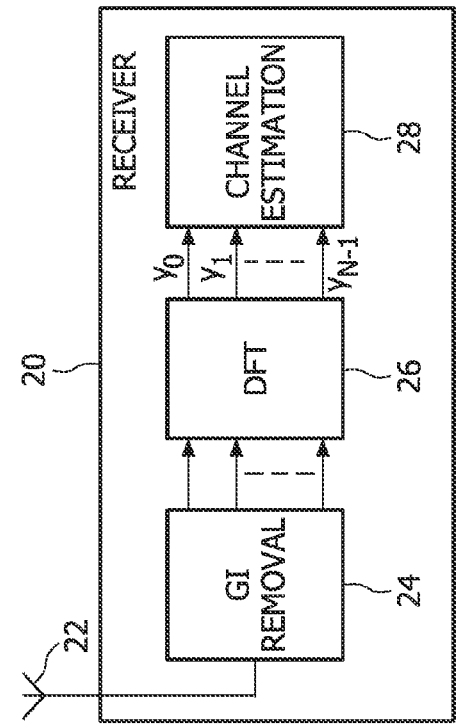
FIG. 2
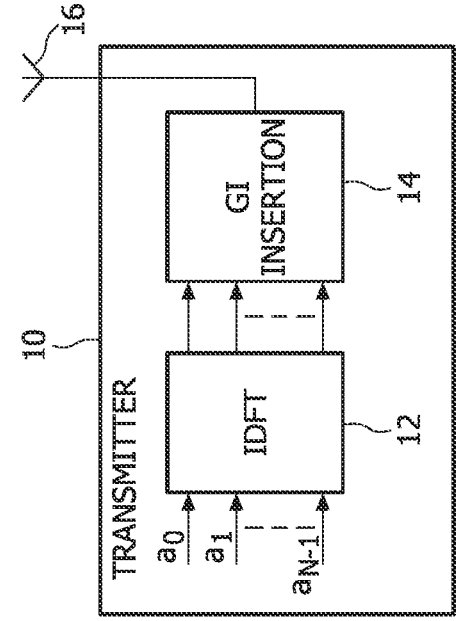

ESTIMATION OF LENGTH OF CHANNEL IMPULSE RESPONSE

The present invention relates to a method of processing OFDM encoded digital signals in a communication system, and a corresponding signal processor.

The invention also relates to a receiver arranged to receive OFDM encoded signals and to a mobile device that is arranged to receive OFDM encoded signals. Finally, the invention relates to a telecommunication system comprising such a mobile device.

The method may be used for deriving improved channel estimation, and hence eventually improving data estimation, in a system using OFDM modulation, such as the terrestrial video broadcasting systems DVB-T or DVB-H. The mobile device according to the invention can for example be a portable TV receiver, a mobile phone, a personal digital assistant (PDA), or a portable computer such as a laptop, or any combination thereof.

In an OFDM communication system, the data to be transmitted is modulated onto a number of subcarrier signals having different frequencies. The receiver then has to demodulate the transmitted data from these subcarrier signals. The received signals are affected by the properties of the wireless channel from the transmitter to the receiver and so, in order to be able to perform this demodulation, the receiver has to use an estimate of the properties of the channel.

The channel can vary with time, and so the channel estimation needs to be performed at regular intervals. Moreover, the channel can vary between the different subcarrier frequencies of the transmitted signal. Based on an estimate of the channel frequency response on a subset of the subcarriers, it is possible to make an estimate of the channel frequency response on the other subcarriers.

U.S. Pat. No. 6,654,429 discloses a method for pilot-aided channel estimation, in which pilot symbols (that is, symbols having known values) are inserted into each transmitted data packet at known positions so as to occupy predetermined positions in the time-frequency space. That is, at particular times, pilot symbols may be transmitted at some of the subcarrier frequencies. At other times, pilot symbols may be transmitted at others of the subcarrier frequencies. By examining the symbols received at those times and frequencies at which pilot symbols were transmitted, it is possible to estimate the channel frequency response at those times and frequencies accurately enough to be useful.

Unpublished Patent Application No. PCT/IB2005/051667 describes a method for processing OFDM encoded digital signals, in which the OFDM encoded digital signals are transmitted as data symbol subcarriers in several frequency channels, with a subset of the subcarriers being pilot subcarriers having known values, the method comprising:

making a first estimation of channel frequency response at the pilot subcarriers; and cleaning the estimated channel frequency response at the pilot subcarriers, using cleaning filters.

It is known that the channel frequency response at the other subcarriers can be obtained by interpolation between the channel frequency response obtained at the pilot subcarriers. This interpolation is performed using interpolation filters. The design of the interpolation filters assumes a finite length for the channel impulse response and a certain channel frequency response correlation.

If the length of the channel impulse response is known, the correct cleaning filters and interpolation filters can be selected, and therefore a better-interpolated channel frequency response can be obtained.

It is also useful to have a good estimate of the length of the channel impulse response for other purposes within the receiver.

The document "OFDM Timing Synchronization Under Multi-path Channels", Chen, et al, Vehicular Technology Conference, 2003; VTC 2003-Spring; 57th IEEE Semiannual Volume 1, 22-25 Apr. 2003, pages 378-382, proposes to estimate the first path in the channel impulse response by using the pilot information to estimate the channel frequency response at the pilot subcarriers, and then performing an inverse Fourier transform on this estimated channel frequency response.

The document "A Novel Channel Estimation Method for OFDM Mobile Communication Systems Based on Pilot Signals and Transform-Domain Processing", Zhao, et al, Proc. IEEE 47th Vehicular Technology Conf., Phoenix, USA, May 1997, pp. 2089-2093 proposes a method of estimating a length of the channel impulse response by using the pilot information to estimate the channel transfer function, and then forming a transform domain representation of the channel transfer function, from which the length of the channel impulse response can be derived.

These methods have the disadvantage that, by using the information carried by the pilot subcarriers, they are effectively undersampling the received data, with the result that channel impulse responses longer greater than a particular length can not be determined, because of aliasing.

An object of the present invention is to provide a method of processing OFDM encoded digital signals, to obtain a good estimate of the length of channel impulse response, even when the channel impulse response is relatively long.

According to a first aspect of the present invention, there is provided a method of processing OFDM encoded signals, wherein said OFDM encoded digital signals are transmitted in a plurality of subcarrier frequency channels, the method comprising:

receiving an OFDM encoded signal comprising a symbol in each of said subcarriers, wherein at least some of said subcarriers contain user data symbols;

forming an initial estimate of a channel frequency response from magnitudes of user data symbols received in said subcarriers; estimating a correlation function of a channel impulse response by performing an inverse Fourier transform on the initial estimate of the channel frequency response; and estimating a length of a channel impulse response by examining peaks in the estimated correlation function of the channel impulse response.

This has the advantage that an accurate estimate of the length of the channel impulse response can be obtained, without using any information carried by the pilot signals. As a result, there is no problem of undersampling the received data, and longer channel impulse response can be determined.

Embodiments of the invention allow an acceptably accurate estimate of the length of channel impulse response to be obtained, even in the presence of noise, inter-symbol interference and Doppler spread, even when the channel length is longer than the guard interval inserted in the OFDM symbols.

According to a second aspect of the present invention, there is provided a receiver including a channel estimator, wherein the channel estimator estimates the length of the channel using a method in accordance with the first aspect of the invention.

Further objects, features and advantages of the invention will become evident from a reading of the following description, in which reference will now be made, by way of example only, to the accompanying drawings, in which:

FIG. 1 is a schematic illustration of a communications system in accordance with the invention;

FIG. 2 is a block schematic diagram illustrating in more detail the communications system in accordance with the invention;

Figure 3:
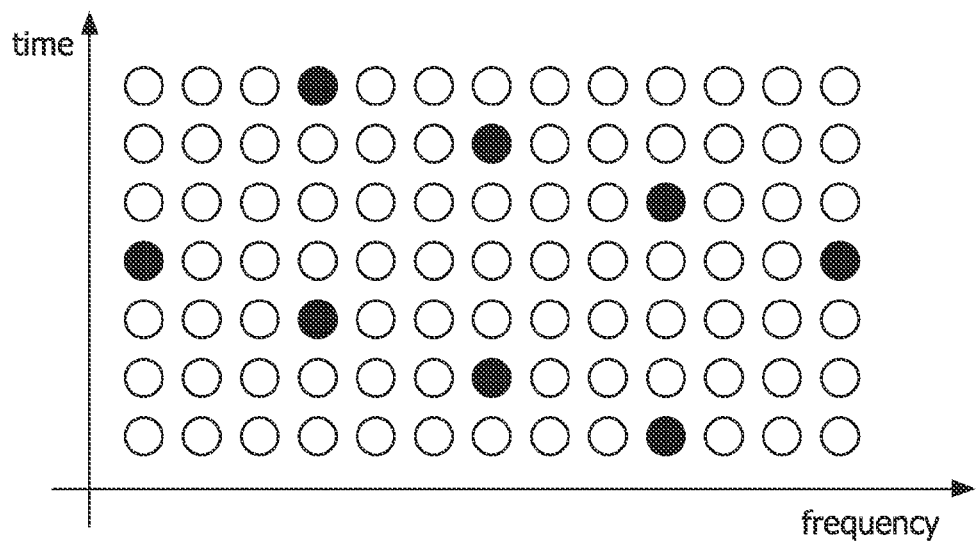
FIG. 3 illustrates the transmission of pilot symbols amongst the useful data in a mobile communications system.

The present invention will be described with reference to a communication system as shown in FIG. 1, in which DVB-T (Digital Video Broadcasting-Terrestrial) signals are broadcast from a transmitter 10. FIG. 1 shows a single receiver 20, which is able to receive the broadcast signals, although it will be appreciated that, in a practical system, there can be expected to be a large number of such receivers that are able to receive the broadcast signals.

The present invention will be further described with reference to a communication system as shown in FIG. 1, in which the receiver 20 is a portable device that is able to receive the broadcast signals while moving in the area around the transmitter 10. Such a system is referred to as a DVB-H (Digital Video Broadcasting-Handheld) system.

As is known, the DVB system is an Orthogonal Frequency Division Multiplexed (OFDM) communication system, in which the data to be transmitted is modulated onto a number, in this case N, where N can be chosen to be 2048, or 4196 (in the case of DVB-H), or 8192, of subcarrier signals having different frequencies. The receiver then has to demodulate the transmitted data from these subcarrier signals. The received signals are affected by the properties of the wireless channel from the transmitter to the receiver and so, in order to be able to perform this demodulation, the receiver has to use an estimate of the properties of the channel.

FIG. 2 is a block schematic diagram illustrating in more detail those components of the transmitter 10 and the receiver 20 that are relevant for an understanding of the present invention. It will of course be appreciated that the transmitter 10 and the receiver 20 have many other features and components, which are not shown in FIG. 2 and will not be described in more detail herein.

In this illustrated embodiment of the invention, the transmitter 10 takes the form of a broadcast transmitter, in which signals are broadcast to a large number of receivers that are potentially able to receive the signals. However, it will be appreciated that the invention is equally applicable to a situation in which the transmitter 10 sends separate signals to respective receivers.

Within the transmitter 10, the data symbols $a_0, a_1, \ldots, a_{N-1}$ for transmission on the N subcarriers in each OFDM symbol period are passed to an inverse digital Fourier transform (IDFT) block 12, for conversion to the time domain. As is known, in one conventional system, each subcarrier can carry either user data, or pilot information, or a null. In a DVB-H system with N=8192, there are 6817 subcarriers containing user data or pilot information, while the remainder, at the two ends of the frequency band, are empty subcarriers. Subcarriers containing user data are referred to as data subcarriers.

The resulting signals are passed to the Guard Interval (GI) insertion block 14, where a guard interval is formed, for example, by repeating a predetermined number of the samples, and is added as a prefix. The predetermined number of the samples is set as a fraction of N. The data is also converted from parallel to serial.

The resulting signal is passed to a transmit antenna 16 for transmission over the wireless interface.

As described above, the receiver 20 takes the form of a mobile device, which can for example be a portable TV receiver, a mobile phone, a personal digital assistant (PDA), or a portable computer such as a laptop, or any combination thereof.

The mobile device 20 has an antenna 22 for receiving signals, and after application to suitable analog receiver circuitry (not shown) and analog-digital conversion, the received signals are passed to a GI removal block 24 for the selection of the required number, N, of samples, for example by removal of the guard interval, and subsequent conversion of the selected samples from serial to parallel.

The resulting data samples in the time domain are passed to a Discrete Fourier Transform (DFT) block 26, for conversion into received symbols $y_0, y_1, \ldots, y_{N-1}$ in the frequency domain.

As will be appreciated by the person skilled in the art, the received signal vector Y (Y being an N×1 vector $y_0, y_1, \ldots, y_{N-1}$, where N is the number of subcarriers, or the FFT size) will show the effects of the channel on the transmitted OFDM symbols A (A also being an N×1 vector made up the transmitted data symbols $a_0, a_1, \ldots, a_{N-1}$), and will contain added noise W. That is:

$$Y = H \cdot A + W$$

where H is an N×N matrix representing the channel frequency response.

If the channel is time-invariant, then the matrix H only has non-zero elements on its main diagonal. If the channel is time-variant during one symbol period, then its time variation is represented by non-zero elements off the main diagonal of the channel matrix H. Since the channel is changing, the channel matrix changes from one symbol period to the next. In the following, the channel matrix H for a particular, nth, OFDM symbol will be referred to as H(n), to underline that the channel matrix can vary from one OFDM symbol to the next.

In order to be able to determine the values of the transmitted symbols from the received symbols, it is therefore necessary to use a value for H(n), the time varying channel frequency response. The received symbols $y_0, y_1, \ldots, y_{N-1}$ in the frequency domain are therefore passed to a channel estimation block 28, which forms a channel estimate.

As is well known, the received symbols, and the channel estimate formed by the channel estimation block 28, are then used to form the required estimate of the symbols making up the transmitted OFDM symbol.

In order to allow the channel estimation block 28 to make an acceptably accurate estimate of the channel, pilot symbols, that is, symbols having known values, are included in the signals transmitted from the transmitter 10, as mentioned previously.

FIG. 3 is a schematic representation of a small part of the time-frequency plane in the DVB-H OFDM communication system. That is, circles at different vertical positions in the plane shown in FIG. 3 represent symbols transmitted at different times, while circles at different horizontal positions in the plane shown in FIG. 3 represent symbols transmitted at different subcarrier frequencies.

In FIG. 3, the solid black circles represent the pilot symbols broadcast from the transmitter 20, while the empty circles represent the data subcarriers broadcast from the transmitter 20.

Thus, in this illustrated example, during any one OFDM symbol period, one subcarrier in twelve contains a pilot symbol. Put another way, one subcarrier in three contains a pilot symbol during one OFDM symbol period in four, while the other two subcarriers are not used to contain pilot symbols. The channel frequency response on the pilot subcarriers can then be used to estimate the channel frequency response on the surrounding subcarriers. It should also be noted that there are other subcarriers (not shown in FIG. 3) that contain pilot symbols during each OFDM symbol period.

Figure 4:
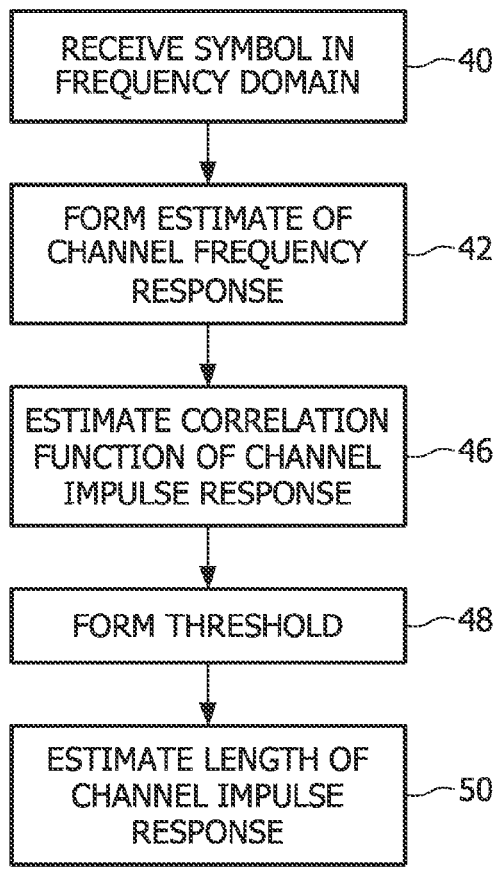
FIG. 4 is a flow chart illustrating a method in accordance with an aspect of the invention.

FIG. 4 is a flow chart, illustrating a method of estimating the length of the channel impulse response. This process can be performed in the channel estimation block, such that the result of the method can be used in part of the process of estimating the properties of the wireless channel from the transmitter 10 to the receiver 20.

For example, the channel estimation process can include a step of interpolation between the properties of the channel, as measured using the pilot symbols, in order to obtain an estimate of the properties of the channel at the data subcarriers. Such interpolation can be performed using interpolation filters, and the choice of the most suitable interpolation filter will depend on the length of the channel impulse response.

The method proceeds from the realization that, since the transmitted data symbols are independently modulated in the frequency domain, and have equal average powers, they can be used as a sounding signal to determine the length of the channel impulse response.

This principle can be used in estimating the length of the channel impulse response, by examining the magnitudes of the received symbols that carry user data. However, in this embodiment of the invention, this is complicated by the fact that, although the pilot subcarriers are also independently modulated in the frequency domain, they have higher average powers than the data subcarriers. Steps can therefore be taken to remove this effect.

In step 40 of the procedure shown in FIG. 4, the symbol is received in the frequency domain. That is, the system receives the values for the symbols in each of the frequency subcarriers. As described above with reference to FIG. 3, some of these subcarriers will be known to be pilot subcarriers during the particular symbol period, while others will be data subcarriers.

The procedure then passes to step 42, in which an estimate of the channel frequency response is formed at each subcarrier.

As described above, it is known that the pilot subcarriers will have a higher power, on average, than the data subcarriers. Therefore, in this embodiment of the invention, steps are taken to whiten the received signal, that is, to make the average power equal for all subcarriers, by de-boosting the pilot subcarriers. In a preferred embodiment of the invention, it is known that the amplitude of the pilot subcarriers is higher, on average, than the amplitude of the data subcarriers by a factor of 4/3. Therefore, in order to whiten the received signal, the amplitude of the pilot subcarriers is multiplied by ¾.

Although the signals will vary in amplitude from one subcarrier to the next, depending on the data being transmitted, such variation will effectively be random. The variation of the amplitude of the subcarriers with frequency is therefore taken as a first approximation to the channel frequency response.

Firstly, for each of the received symbols $y_k = y_0, y_1, \ldots, y_{N-1}$ during one OFDM symbol period, the squared absolute value $|y_k|^2$ is calculated, it being noted that, for empty subcarriers, $|y_k|^2 = 0$.

Then, the estimate of the channel frequency response at each subcarrier is formed as:

$$|\hat{H}_k|^2 = \begin{cases} 0, & k \in I_{null} \\ |y_k|^2, & k \in I_{data} \\ \frac{9}{16}|y_k|^2, & k \in I_{pilot} \end{cases}$$

where $H_k$ is the (k,k) element of matrix H of a certain OFDM symbol, $I_{null}$, $I_{data}$ and $I_{pilot}$ are the sets of empty subcarrier indices, data subcarrier indices and pilot subcarrier indices, respectively, during that particular OFDM symbol period.

The procedure then passes to step 46, in which this initial estimate of the channel frequency response is used to form an estimate of the correlation of the channel impulse response.

Specifically, if the correlation of the channel impulse response is denoted by $R_{hh}(\tau)$, and a discrete-time sampled version of this correlation is denoted by $R_{hh}(i)$, then g(i) can be considered as an approximation of $R_{hh}(i)$, where g(i) is obtained by performing the Inverse Discrete Fourier Transform (IDFT) on $|\hat{H}_k|^2$. That is:

$$g(i) = \sum_{k=0}^{N-1} |\hat{H}_k|^2 e^{j\frac{2\pi i k}{N}}$$

It will be noted that, for this step, it is only necessary to perform a real IDFT operation, rather than a complex IDFT, thereby reducing the number of calculations required. Moreover, as $|y_k|^2$ is a real signal, g(i) is a Hermitian function, and so it is only necessary to calculate N/2 values of g(i), rather than all N values.

Figure 5:
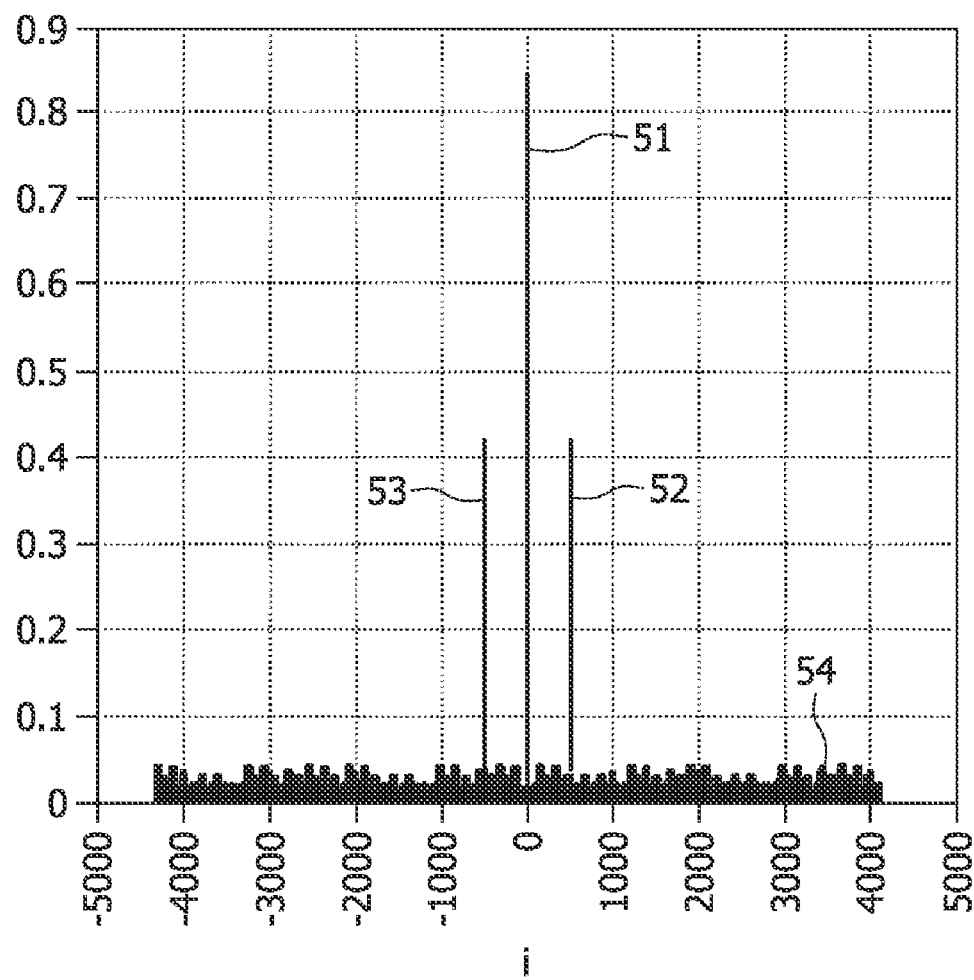
FIG. 5 is a plot illustrating a result of a step in the method of FIG. 4.

FIG. 5 is a plot of the absolute value of the resulting value of g(i) against i, in one particular case, in which 16-QAM (Quadrature Amplitude Modulation) is used, in order to illustrate how this estimate of the correlation function of the channel impulse response is used to form an estimate of the length of the channel impulse response. Specifically, the plot shows a large peak 51 at i=0, and two other large peaks 52, 53, in this case at i=±512. This pattern is characteristic of a channel having two paths of substantially equal powers. In the case of a channel with more paths, there will be more peaks in the plot of g(i).

At other values of i, indicated generally by the reference numeral 54, the value of g(i) takes much lower values, resulting from coincidental correlations between the values of the signals on different subcarriers.

The level of the values of g(i) at the other values of i is referred to as the level of the "grass", because of its resemblance to grass in the plot.

Figure 6:
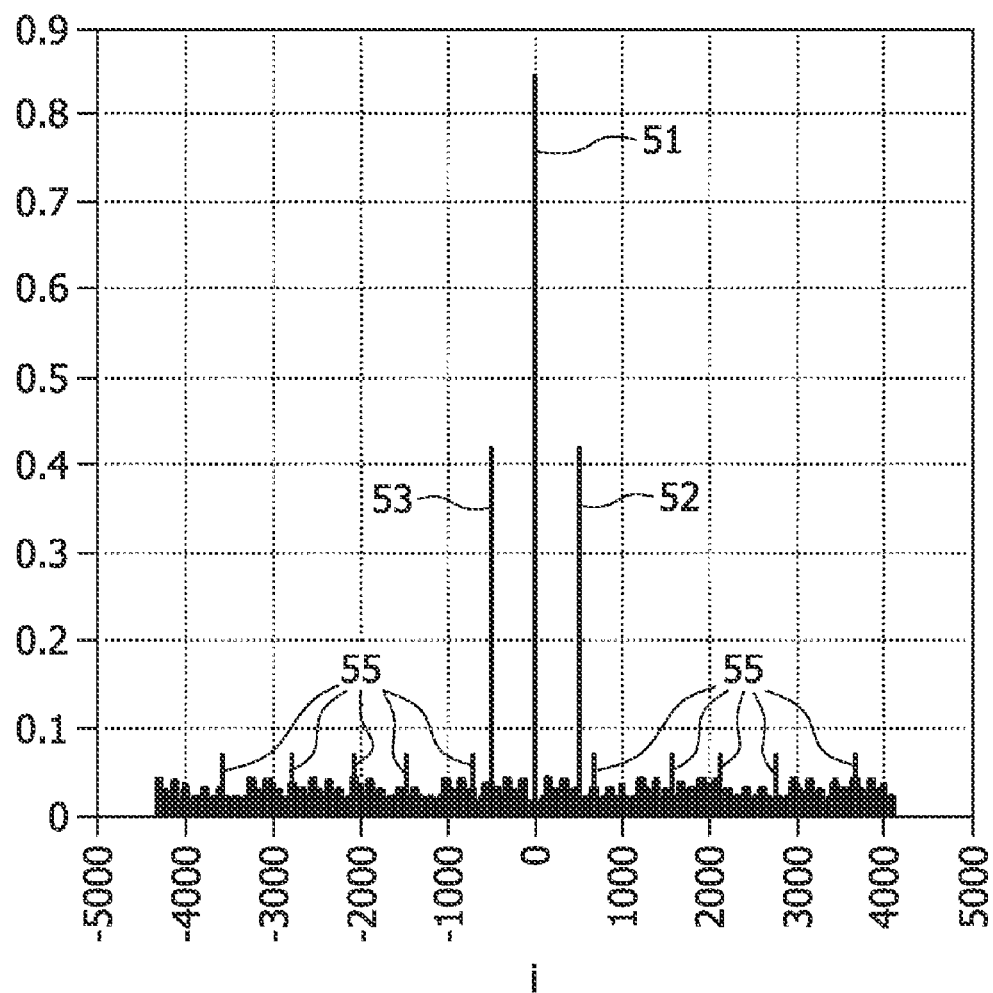
FIG. 6 is a plot further illustrating a result of a step in the method of FIG. 4.

FIG. 6 is a plot of the absolute value of the resulting value of g(i) against i, provided for comparison purposes, showing the result that might be obtained without performing the step of de-boosting the values of the symbols at the pilot subcarriers. As can be seen from FIG. 6, as well as the large peak 51 at i=0, and two other large peaks 52, 53, there are other smaller peaks 55 at other values of i, resulting from the fact that pilot subcarriers have larger average power than data subcarriers. In this illustrated example, it is still relatively easy to distinguish the large peaks 52, 53 from the smaller peaks 55, and so the method would still work without the de-boosting step but, in other situations, the presence of the smaller peaks 55 may make it difficult to identify the peaks that are relevant for determining the length of the channel impulse response.

Each peak position indicates a time shift for which there is a coincidence between two paths in the channel impulse response correlation, and so, to determine the length of the channel impulse response, it is necessary to find the last non-zero value in the plot. However, the presence of grass, resulting from the coincidental correlations of values, means that, strictly, there are no non-zero values, although peaks in the correlation function are potentially the result of echoes in the received signal.

Therefore, in order to obtain an estimate of the length of the channel impulse response from the plot shown in FIG. 5, in a situation where there is grass, it is necessary to compare each of the values of g(i) with a threshold value $g_{th}$, in order to determine which peaks are to be taken into consideration when forming the estimate of the length of the channel impulse response, and which smaller peaks are to be disregarded. The length of the channel impulse response can then be derived as the largest value of i for which the magnitude of g(i) exceeds that threshold. That is:

$$L_{CIR} = \max\{i \in [0, N-1] | \; |g(i)| \geq g_{th}\}$$

In step 48 of the procedure shown in FIG. 4, the necessary threshold is formed. In this embodiment of the invention, the threshold value $g_{th}$ is formed as the product of a constant multiplicative factor, c, and the mean level of the grass, $g_{grass}$. That is, $$g_{th} = c \cdot g_{grass}$$

The value of the mean level of the grass, $g_{grass}$, can be calculated in each OFDM symbol, or a pre-calculated fixed value can be used. If a pre-calculated fixed value is to be used, it can be calculated theoretically, or it can be obtained by an averaging process. Specifically, it can be assumed that the channel impulse response length will not be longer than a certain value, Lmax, and therefore this averaging process can form the average value of |g(i)| for values of i larger than Lmax, over many channel and symbol realizations. Because the length of the guard interval, or cyclic prefix, is chosen to be less than the length of the channel impulse response, the averaging can be performed for some or all of the values of i such that $N \times CP_{ratio} < i < N/2$, where $CP_{ratio}$ is the length of the cyclic prefix as a proportion of the length of the useful part of the OFDM symbol, and hence $N \times CP_{ratio}$ is the length of the cyclic prefix.

Alternatively, if, as is preferred, the mean level of the grass, $g_{grass}$, is to be calculated during each OFDM symbol, then, again, this should be done by examining values of g(i) that are known to be part of the grass, for example for relatively large values of i such that $N \times CP_{ratio} < i < N/2$, as defined above. That is, $$g_{grass} = \frac{1}{\frac{N}{2} - N \cdot CP_{ratio}} \sum_{i=N \cdot CP_{ratio}+1}^{N/2} |g(i)|$$

As mentioned above, the required threshold value $g_{th}$ is formed as the product of a multiplicative factor, c, and the mean level of the grass, $g_{grass}$. The multiplicative factor, c, can, for example be 4 or 5, although it may be determined experimentally that other values can be used in particular situations, in order to differentiate between those relatively low peaks in the plot of g(i) that are part of the autocorrelation of the channel echoes and those that are not.

Figure 7:
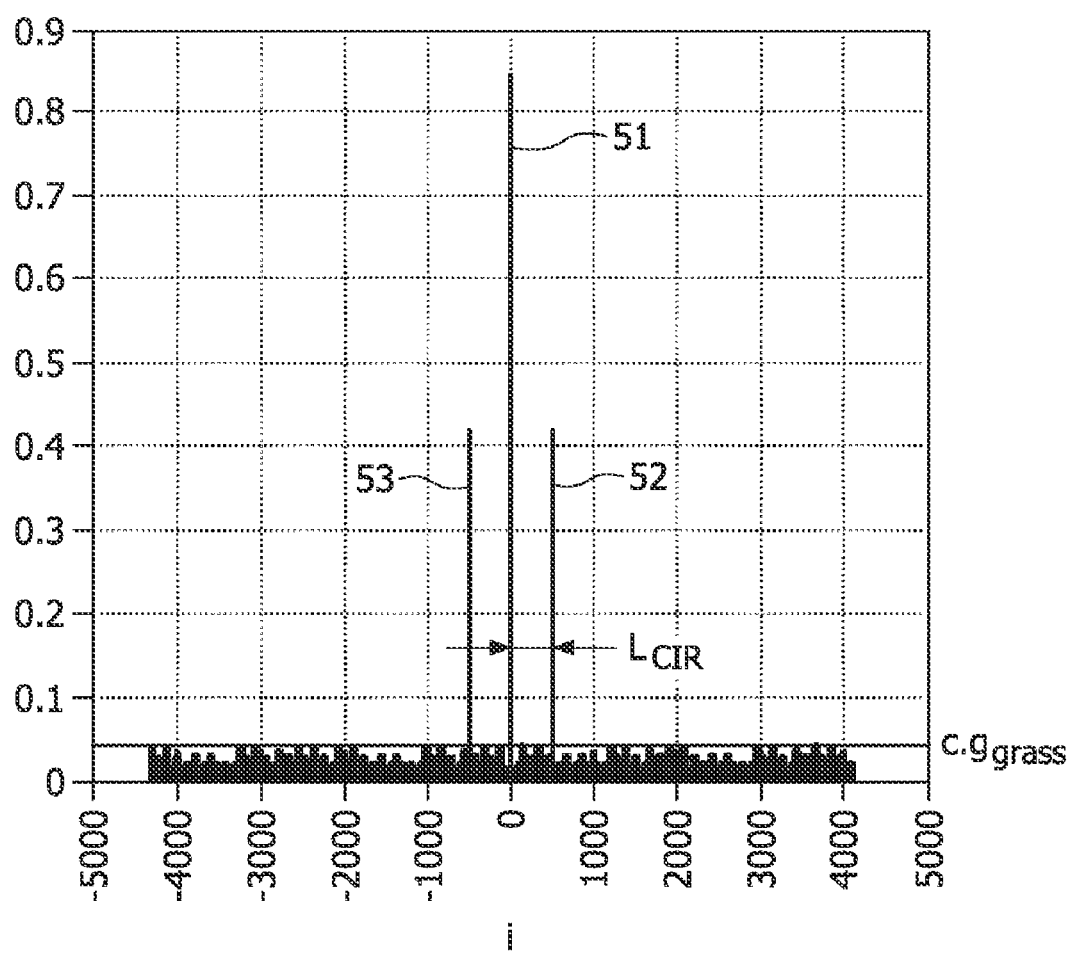
FIG. 7 is a plot illustrating a result of a further step in the method of FIG. 4.

FIG. 7 shows the threshold value $g_{th} = c \cdot g_{grass}$ added to the plot shown in FIG. 5. According to step 50 of the procedure shown in FIG. 4, a value for the length of the channel impulse response is then estimated. Specifically, each peak in the plot of g(i) that is higher than the threshold value $g_{th} = c \cdot g_{grass}$ is examined.

As described above, in FIGS. 5 and 7, there are two significant peaks 52, 53 in the plot of g(i). In this case, the distance of each of these peaks from the large peak 51 at i=0, i.e. the value of i at which the peak occurs, is a measure of the length of the echo causing that peak, relative to the length of the direct path from transmitter to receiver. More generally, the distance of the last peak from the largest peak is a measure of the length of the channel, and the total length of the channel impulse response $L_{CIR}$ is therefore obtained by examining the peak that occurs at the largest value of i, out of all of the peaks that exceed the threshold value. That is, as mentioned above:

$$L_{CIR} = \max\{i \in [0, N-1] | \; |g(i)| \geq g_{th}\}$$

Thus, in the case illustrated in FIG. 7, with the two large peaks 52, 53 appearing at i=±512, and no other peaks exceeding the threshold value, the length of the channel impulse response is estimated to be 512 OFDM time samples.

There is therefore described a method for forming an estimate of the length of the channel impulse response.

In a further embodiment of the invention, the estimate of the channel frequency response, as described above with reference to step 42 in the procedure of FIG. 4, and as used in forming the estimate of the correlation function of the channel impulse, as described above with reference to step 46 in the procedure of FIG. 4, is performed over multiple OFDM symbol periods, instead of over just one OFDM symbol period.

Specifically, in order to form the estimate of the channel frequency response, instead of using $|y_k|^2$, the squared absolute values of the data subcarriers in one symbol period, the procedure uses the average of $|y_k|^2$ over a number M of OFDM symbol periods. Preferably, M=4 or a multiple of 4.

Averaging over multiple OFDM symbol periods has the advantage that the level of the "grass" in the plot of g(i) is reduced, and so it is easier to estimate the channel length correctly when the last peak has low amplitude.

Moreover, if M=4 or a multiple of 4, then, in this illustrated example, the de-boosting of the pilot subcarriers becomes easier. Specifically, as shown in FIG. 3, in this illustrated embodiment, one third of the subcarriers contain one pilot symbol in every block of four consecutive OFDM symbol periods, and it is not necessary to know which of those four OFDM symbol periods is the one in which the pilot symbol is transmitted.

Thus, the estimate of the channel frequency response $|H(f)|^2$ for all subcarriers, for $f = k \cdot f_s$, where $f_s$ is the subcarrier spacing, denoted as above by $|\tilde{H}_k|^2$, is calculated from the average of $|y_k|^2$ over a number M of OFDM symbol periods, where M=4 or a multiple of 4.

In this case, the effect of pilot de-boosting can be achieved by performing the compensation at this stage, without needing to know which subcarriers are in fact pilot subcarriers during any particular OFDM symbol period. In the illustrated example, as mentioned above, there are subcarrier indices $I_{null}$ that are always empty, subcarrier indices $I_{all\_data}$ that always contain data, subcarrier indices $I_{all\_pilot}$ that always contain pilots, and subcarrier indices $I_{some\_pilot}$ that contain pilots during one quarter of the symbols. The amplitude of the pilots needs to be de-boosted by a factor of ¾, with the result that the power of these pilots needs to be de-boosted by a factor of 9/16. Therefore, the de-boosted estimate $|\hat{H}_k|^2$ of the channel frequency response can be obtained as:

$$|\hat{H}_k|^2 = \begin{cases} 0, & k \in I_{null} \\ \frac{1}{M}\sum_{m=0}^{M-1}|y_{k,m}|^2, & k \in I_{all\_data} \\ \frac{9}{16} \cdot \frac{1}{M}\sum_{m=0}^{M-1}|y_{k,m}|^2, & k \in I_{all\_pilot} \\ \left(\frac{3}{4} \cdot 1 + \frac{1}{4} \cdot \frac{16}{9}\right)^{-1} \cdot \frac{1}{M}\sum_{m=0}^{M-1}|y_{k,m}|^2, & k \in I_{some\_pilot} \end{cases}$$

For systems in which the arrangement of pilot subcarriers is different, or the power of the pilot subcarriers is different from the power of the data subcarriers by some different factor, then different weightings can be applied, as will be apparent to the person skilled in the art.

Effectively as described above with reference to step 46 of the procedure shown in FIG. 4, the plot of g(i) can be obtained using this estimate $|\hat{H}_k|^2$ of the channel frequency response. Thus:

$$g(i) = \sum_{k=0}^{N-1} |\hat{H}_k|^2 e^{j\frac{2\pi i k}{N}}$$

As before, this plot of g(i) can be used to form an estimate of the length of the channel impulse response.

There is thus described a further method for processing received signals to form an estimate of the length of the channel impulse response.

Further modifications of the described methods can be made, within the scope of the invention.

For example, in performing the method as described above, there is a possibility that the choice of the multiplicative factor, c, used in forming the threshold value $g_{th}$ will be such that side lobes resulting from the empty subcarriers will erroneously be determined to be peaks that should be taken into consideration when estimating the length of the channel impulse response.

In order to reduce this possibility, it is advantageous to apply a non-rectangular window function to the input of the Inverse Discrete Fourier Transform (IDFT), in order to suppress the values of g(i) for side lobes around the peaks in g(i). This is applicable whether or not the estimate of the channel frequency response has been de-boosted to deal with the effect of the pilot symbols, but is illustrated below for the case where a window function is applied to the de-boosted and averaged estimate $|\hat{H}_k|^2$ of the channel frequency response. Thus, the windowed estimate of the channel frequency response is:

$$|\hat{H}_k|^2 = \begin{cases} 0, & k \in I_{null} \\ w(k-N/2) \cdot \frac{1}{M}\sum_{m=0}^{M-1}|y_{k,m}|^2, & k \in I_{all\_data} \\ w(k-N/2) \cdot \frac{9}{16} \cdot \frac{1}{M}\sum_{m=0}^{M-1}|y_{k,m}|^2, & k \in I_{all\_pilot} \\ w(k-N/2) \cdot \left(\frac{3}{4} \cdot 1 + \frac{1}{4} \cdot \frac{16}{9}\right)^{-1} \cdot \frac{1}{M}\sum_{m=0}^{M-1}|y_{k,m}|^2, & k \in I_{some\_pilot} \end{cases}$$

for integer n, and the window function is preferably a triangular window:

$$w(n) = 1 - \frac{|n|}{\frac{K_{max}}{2}+1}$$

or a Hann window:

$$w(n) = 0.5\left(1 + \cos\left(\frac{2n\pi}{K_{max}}\right)\right)$$

where ($K_{max}$+1) is the number of data subcarriers.

In the description above, the function of |g(i)| was used to form an estimate of the length of the channel impulse response, with |g(i)| having been obtained by performing the Inverse Discrete Fourier Transform (IDFT) on $|\hat{H}_k|^2$. However, a simplified calculation can be used if, instead, a function of $|g(i)|^2$ is used to form the estimate of the length of the channel impulse response, as this can be obtained more directly from the IDFT operation.

In this case:

$$L_{CIR} = \max\{i \in [0, N-1] \mid |g(i)|^2 \geq g_{th,1}\}$$

and the threshold value can be formed as $g_{th,1} = c_1 \cdot g_{grass,1}$, where:

$$g_{grass,1} = \frac{1}{\frac{N}{2} - N \cdot CP_{ratio}} \sum_{i=N \cdot CP_{ratio}+1}^{N/2} |g(i)|^2$$

The averaging and windowing operations can still be performed in the same way as described above, when $|g(i)|^2$ is used.

In a further modification of the method described above, the estimate of the length of the channel impulse response can be formed from $|g(i)|^2$, or |g(i)| by comparison with two thresholds.

Specifically, in one embodiment, a first thresholding method, where the threshold is calculated based on the randomness of the data is combined with a second thresholding method, where the threshold is calculated based on the characteristics of the channel correlation itself.

The first thresholding method can be generalized as follows (whether or not the second thresholding method is also applied):

$$L_{CIR,1} = \max\{i \in [0, N-1] \mid f_1(g(i)) \geq g_{t,1}\}$$

$f_1(g(i))$ can for example be |g(i)| or $|g(i)|^2$ or any other function of |g(i)| or $|g(i)|^2$ and $g_{t,1}$ is a first threshold determined from:

$$g_{t,1} = f_2(g(i_1), \ldots, g(i_K)), i_1, \ldots, i_K \in I_g$$

where $I_g$ is a set of indices corresponding to the grass-only area. This first threshold has the purpose of minimizing the probability of detecting a peak in the grass, and thereby possibly obtaining a value for the channel length that is too large.

The function $f_2$ can be an L-norm of $f_1$, for example the L1 norm or the L2 norm:

$$f_2^{(1)}(g(i_1), \ldots, g(i_K)) = c_1 \cdot \sum_{i \in I_g} |f_1(g(i))|$$

or $$f_2^{(2)}(g(i_1), \ldots, g(i_K)) = c_2 \cdot \sqrt{\sum_{i \in I_g} |f_1(g(i))|^2}$$

A second thresholding method is also applied, and this can be written in a generalized form as:

$$L_{CIR,2} = \max\{i \in [0, N-1] \mid f_3(g(i)) \geq g_{t,2}\}$$

$f_3(g(i))$ can be the same as $f_1(g(i))$, or it can be different. For example, $f_3(g(i))$ can be $|g(i)|/|g(0)|$.

The second threshold $g_{t,2}$ is determined in such a way that it minimizes the probability of detecting a side lobe, or it maximizes the probability of detecting or estimating the channel length that contains 99% (or some other proportion, such as 99.9%) of the total energy of the channel. The second threshold, as discussed above with reference to the first threshold, can be a fixed threshold value (for example determined experimentally), or can be calculated on the fly.

When both thresholding methods have been applied, the final estimate of the length of the channel impulse response can be obtained from:

$$L_{CIR} = \min(L_{CIR,1}, L_{CIR,2})$$

If $f_3(g(i))$ is the same as $f_1(g(i))$, the thresholding can be carried out in a different way. Rather than determining two values for the length of the channel impulse response, and then taking the smaller of these two values, the maximum of the two thresholds can be found, and then the length of the channel impulse response can be found from this maximum threshold value. Thus:

$$g_{t,max} = \max(g_{t,1}, g_{t,2})$$

and:

$$L_{CIR} = \max\{i \in [0, N-1] \mid f_1|g(i)| \geq g_{t,max}\}$$

There is therefore described a method for estimating the length of the channel impulse response that provides accurate estimates, even when the channel length is longer than the available guard interval.

The invention claimed is:

1. A method of processing OFDM encoded signals, wherein said OFDM encoded digital signals are transmitted in a plurality of subcarrier frequency channels, the method comprising:
   receiving an OFDM encoded signal comprising a symbol in each of said subcarriers, wherein at least some of said subcarriers contain user data symbols;
   forming an initial estimate of a channel frequency response from magnitudes of user data symbols received in said subcarriers;
   estimating a correlation function of a channel impulse response by performing an inverse Fourier transform on the initial estimate of the channel frequency response; and
   estimating a length of a channel impulse response by examining peaks in the estimated correlation function of the channel impulse response.

2. A method as claimed in claim 1, wherein at least some of said subcarriers contain pilot data symbols, said pilot data symbols having larger magnitudes, on average, than said user data symbols, the method comprising:
   post-whitening the received signal by de-boosting the pilot data symbols; and
   forming the initial estimate of the channel frequency response from magnitudes of user data symbols and magnitudes of de-boosted pilot data symbols.

3. A method as claimed in claim 2, wherein post-whitening the received signal comprises multiplying the pilot data symbols by a constant factor.

4. A method as claimed in claim 1, wherein estimating the length of the channel impulse response comprises detecting peaks in the estimated correlation function of the channel impulse response by comparing the estimated correlation function of the channel impulse response with a threshold.

5. A method as claimed in claim 4, wherein said threshold is formed by:
   selecting at least one region of the correlation function of the channel impulse response in which no effect of echoes is expected;
   forming an average value of said correlation function in said at least one region; and
   forming said threshold as a multiple of said average value.

6. A method as claimed in claim 5, wherein said threshold is formed as an average value over several OFDM symbols.

7. A method as claimed in claim 5, wherein said threshold is a pre-calculated threshold value.

8. A method as claimed in claim 4, wherein estimating a length of a channel impulse response comprises selecting a position on the estimated correlation function of the channel impulse response, at which a value of the estimated correlation function exceeds the threshold, and which corresponds to a longest echo.

9. A method as claimed in claim 4, wherein estimating a length of a channel impulse response comprises:
   selecting a first position, corresponding to a longest echo on the estimated correlation function of the channel impulse response, at which a value of the estimated correlation function exceeds the threshold,
   selecting a second position, corresponding to a longest echo on the estimated correlation function of the channel impulse response, at which the value of the estimated correlation function exceeds a second threshold, and
   taking as an estimate of the length of the channel impulse response a selected position on the estimated correlation function of the channel impulse response, the selected position being a one of the first position and the second position, which corresponds to the shorter echo.

10. A method as claimed in claim 9, wherein said threshold is calculated based on randomness of the data, and wherein said second threshold is calculated based on characteristics of the channel.

11. A method as claimed in claim 1, wherein estimating the correlation function of the channel impulse response comprises:
   forming squares of absolute values of received symbols in one symbol period; and
   performing an inverse Fourier transform on the squared absolute values.

12. A method as claimed in claim 1, wherein estimating the correlation function of the channel impulse response comprises:
   forming averages of squares of absolute values of received symbols in a plurality of symbol periods; and
   performing an inverse Fourier transform on the averaged squared absolute values.

13. A method as claimed in claim 1, further comprising applying a window function to the estimate of the channel frequency response before performing the inverse Fourier transform thereon.

14. A method as claimed in claim 13, wherein said window function is non-rectangular.

15. A method as claimed in claim 14, wherein said window function is triangular.

* * * * *